United States Patent
Koski et al.

(10) Patent No.: US 8,000,859 B2
(45) Date of Patent: Aug. 16, 2011

(54) DUEL CONTROL SOLENOID CIRCUIT

(75) Inventors: Jack P. Koski, South Lyon, MI (US);
Mark A. Vernacchia, Northville, MI (US)

(73) Assignee: GM Global Technology Operations LLC (US)

( * ) Notice: Subject to any disclaimer, the term of this patent is extended or adjusted under 35 U.S.C. 154(b) by 677 days.

(21) Appl. No.: 12/119,744

(22) Filed: May 13, 2008

(65) Prior Publication Data
US 2009/0062976 A1    Mar. 5, 2009

Related U.S. Application Data

(60) Provisional application No. 60/966,865, filed on Aug. 30, 2007.

(51) Int. Cl.
*B60G 23/00*    (2006.01)

(52) U.S. Cl. ........................................................ 701/39
(58) Field of Classification Search .................... 701/29, 701/36, 39, 51, 62; 477/34, 65; 361/170
See application file for complete search history.

(56) References Cited

U.S. PATENT DOCUMENTS 3,710,651 A * 1/1973 Marumo et al. .............. 477/160
4,991,096 A * 2/1991 Glowczewski et al. ......... 701/62

* cited by examiner

*Primary Examiner* — Kim T Nguyen

(57) ABSTRACT

A solenoid control system for a vehicle comprises a primary controller, a failover controller, and a failover control module. The primary controller generates a first solenoid drive signal based upon a control signal. The failover controller selectively generates a second solenoid drive signal based upon the control signal. The failover control module receives an operating signal that indicates whether the primary controller is functioning properly and selects the second drive signal to drive a solenoid when the operating signal indicates that the primary controller is not functioning properly.

19 Claims, 9 Drawing Sheets

DUEL CONTROL SOLENOID CIRCUIT

CROSS-REFERENCE TO RELATED APPLICATIONS

This application claims the benefit of U.S. Provisional Application No. 60/966,865, filed on Aug. 30, 2007. The disclosure of the above application is incorporated herein by reference in its entirety.

FIELD

The present disclosure relates to a dual control solenoid system in a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a solenoid control system according to the prior art is presented. A solenoid controller 102 receives a control signal from a control device 104. For example, the control device 104 may include a gear shifter 106, an engine control module, a transmission control module, or a braking module. The solenoid controller 102 generates a drive signal based upon the control signal. The drive signal actuates a solenoid 120. In various implementations, the solenoid 120 may move between two or more positions.

The solenoid 120 may be included in a transmission 122, an emissions system, an air management system, or any other vehicle system that may be controlled by the solenoid 120. For example, the solenoid 120 may be included in the transmission 122 to engage or disengage a gear. In various implementations, the solenoid 120 may be included in the emissions system to regulate exhaust gas entering an intake manifold. The solenoid 120 may also be included in the air management system to divert airflow and/or vacuum.

SUMMARY

A solenoid control system for a vehicle comprises a primary controller, a failover controller, and a failover control module. The primary controller generates a first solenoid drive signal based upon a control signal. The failover controller selectively generates a second solenoid drive signal based upon the control signal. The failover control module receives an operating signal that indicates whether the primary controller is functioning properly and selects the second drive signal to drive a solenoid when the operating signal indicates that the primary controller is not functioning properly.

In other features, a transmission system comprises the solenoid control system and a transmission including the solenoid. The solenoid selectively engages a gear within the transmission. The transmission system further comprises a gear shifter that generates the control signal.

In further features, the failover control module selects the first solenoid drive signal to drive the solenoid when the operating signal indicates that the primary controller is functioning properly. The failover control module further comprises a first switching module and a second switching module. The first switching module selectively passes the first solenoid drive signal to the solenoid based upon the operating signal. The second switching module selectively passes the second solenoid drive signal to the solenoid based upon the operating signal.

In still further features, the operating signal is received from the primary controller. The operating signal comprises a voltage of a node of the primary controller. The solenoid control system further comprises an operation module. The operation module determines whether the primary controller is functioning properly and generates the operating signal accordingly.

In still further features, the operation module determines whether the primary controller is functioning properly based upon a comparison of the first solenoid drive signal with a predicted drive signal. The operation module determines whether the primary controller is functioning properly based upon a comparison of the first and second solenoid drive signals. The operation module directs the failover controller to generate the second solenoid drive signal when the first controller is not functioning properly.

A method comprises generating a first solenoid drive signal based upon a control signal, selectively generating a second solenoid drive signal based upon the control signal, generating an operating signal that indicates whether the first drive signal is reliable, and selecting the second solenoid drive signal to drive a solenoid when the operating signal indicates that the first solenoid drive signal is not reliable.

In further features, the method further comprises generating the control signal based upon operation of a gear shifter. The method further comprises selecting the first solenoid drive signal to drive the solenoid when the operating signal indicates that the first solenoid drive signal is reliable. The method further comprises generating the operating signal based upon a voltage of a node that indicates whether the first solenoid drive signal is reliable.

In still further features, the method further comprises determining whether the first solenoid drive signal is reliable based upon a comparison of the first solenoid drive signal with a predicted solenoid drive signal. The method further comprises determining whether the first solenoid drive signal is reliable based upon a comparison of the first and second solenoid drive signals. The method further comprises directing that the second solenoid drive signal be generated when the operating signal indicates that the first solenoid drive signal is not reliable.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way, wherein.

DETAILED DESCRIPTION

Figure 1:
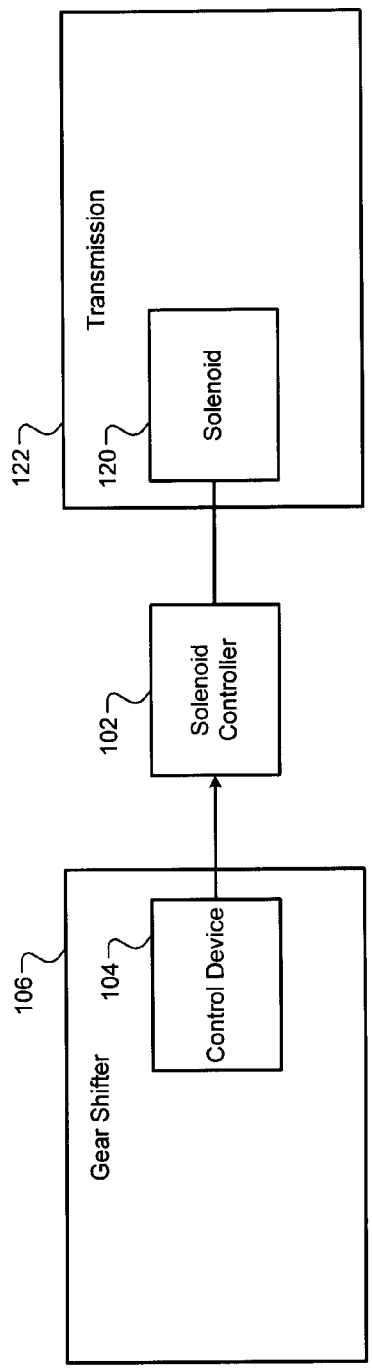
FIG. 1 is a functional block diagram of a solenoid control system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A redundant solenoid control system may be implemented to maintain proper vehicle operation in the event that the solenoid controller 102 fails. For example, a redundant solenoid control system may be used in the transmission 122 to maintain shifting performance in the event of a failure of the solenoid controller 102. In the emissions system, a redundant solenoid control system may be used to maintain reliable control of the emissions of the vehicle. A redundant solenoid control system may also be used in the air management system to maintain optimal performance of the vehicle.

Figure 2:
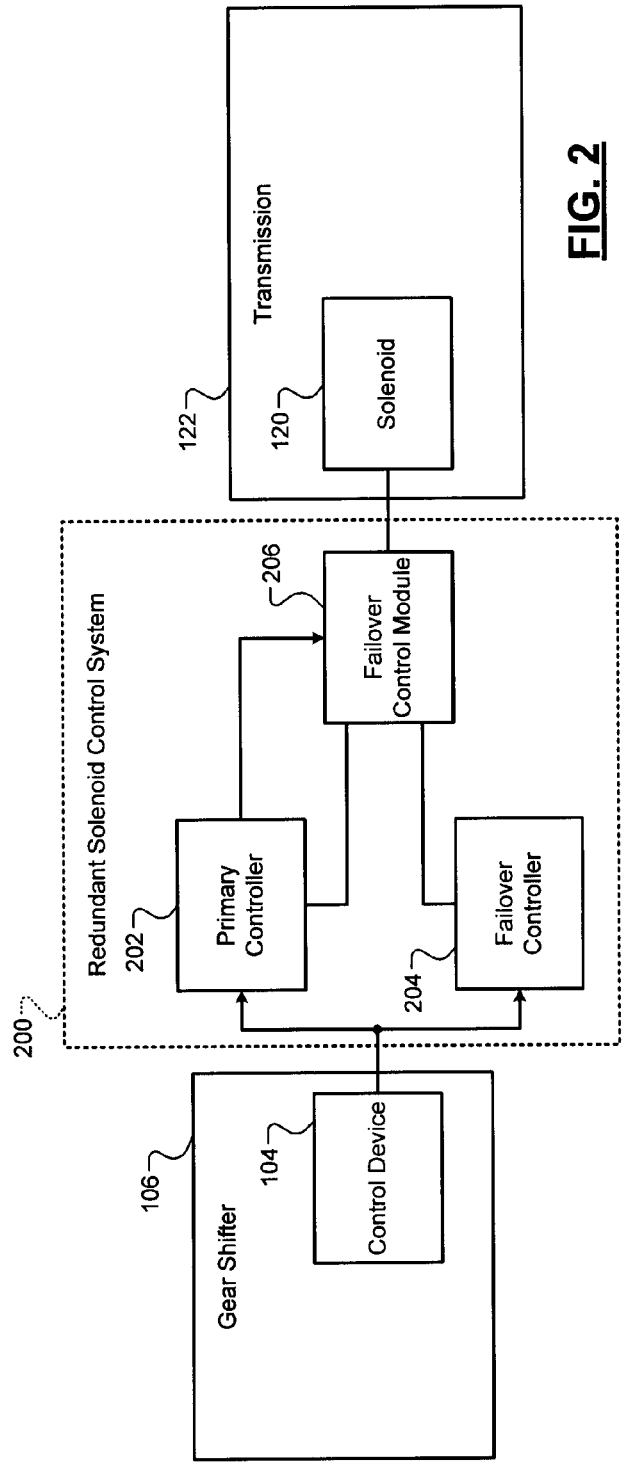
FIGS. 2-2A are functional block diagrams of exemplary redundant solenoid control systems according to the principles of the present disclosure.

Referring now to FIG. 2, a functional block diagram of an exemplary redundant solenoid control system 200 according to the principles of the present disclosure is presented. In various implementations, the redundant solenoid control system 200 includes a primary controller 202, a failover controller 204, and a failover control module 206. In addition, the redundant solenoid control system 200 may include additional failover controllers (not shown).

For purposes of example only, the redundant solenoid control system 200 is shown in a transmission system. When used in the transmission system, the control device 104 generates the control signal based upon operation of the gear shifter 106 by the driver. In various implementations, the control signal may be generated by an engine control module, a transmission control module, a braking module, or any other control module within the vehicle.

The primary controller 202 and the failover controller 204 receive the control signal. In various implementations, the primary and failover controllers 202 and 204 may include feedback controllers, feedforward controllers, open loop controllers, and/or programmable-integral-derivative (PID) controllers. For example, the primary and failover controllers 202 and 204 may include high side and low side drivers. When high side and low side drivers are implemented, the connections shown in FIG. 2 without arrowheads may include high side and low side connections.

The primary controller 202 and the failover controller 204 each generate a drive signal based upon the control signal. For example, the drive signals may include alternating current (AC) signals, direct current (DC) signals, and/or pulse-width modulation (PWM) signals. The primary controller 202 and the failover controller 204 transmit the drive signals to the failover control module 206.

To ensure reliable operation of the failover control module 206, the failover control module 206 and/or various components of the failover control module 206 may receive power from a power source other than the primary controller 202. For example, the failover control module 206 and/or various components of the failover control module 206 may receive power from the failover controller 204 or an independent power source (not shown).

The failover control module 206 receives an operating signal that indicates whether the primary controller 202 is functioning properly. The operating signal may include an AC signal, a DC signal, and/or a PWM signal. The operating signal may also include an active-high or active-low digital signal. In various implementations, the operating signal may include a voltage or current from a node of the primary controller 202. The node of the primary controller 202 may be selected such that the failure of the primary controller 202 will produce a measurable change in voltage or current at the node.

Based upon the operating signal, the failover control module 206 selects one of the drive signals to pass to the solenoid 120. When the operating signal indicates that the primary controller 202 is functioning properly, the failover control module 206 selects the drive signal from the primary controller 202. Otherwise, the failover control module 206 selects the drive signal from the failover controller 204. In various implementations, the failover control module 206, the primary controller 202, and/or the failover controller 204 may be integrated into a single control module or integrated circuit.

The selected drive signal from the failover control module 206 actuates the solenoid 120. In various implementations, the solenoid 120 may move between two or more positions. For example, if the solenoid 120 is included in the transmission 122, the solenoid 120 may engage or disengage a gear. If the solenoid 120 is included in an emissions system, the solenoid 120 may regulate exhaust gas in an intake manifold. If the solenoid 120 is included in an air management system, the solenoid 120 may divert airflow and/or vacuum.

Figure 2A:
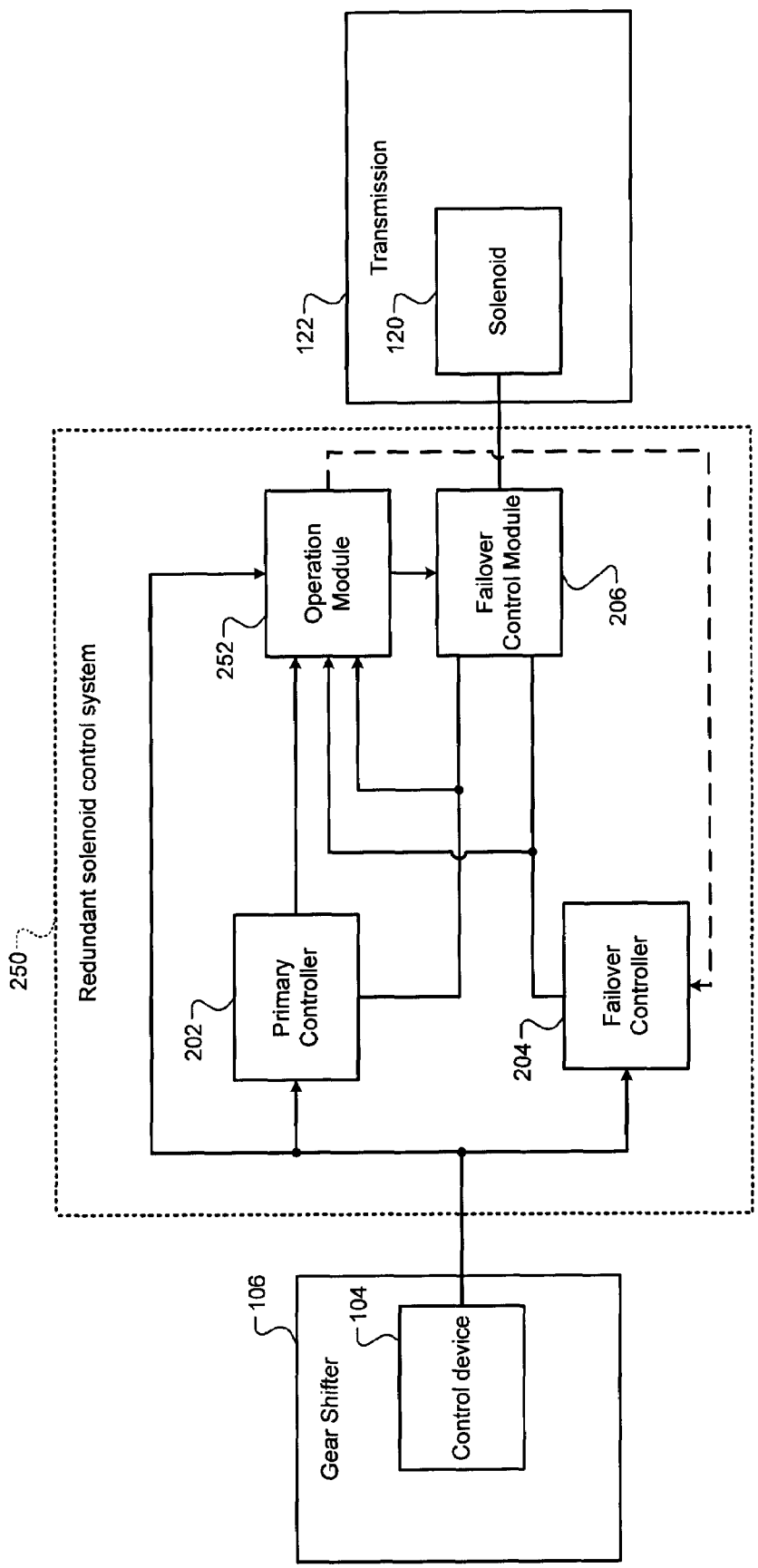

Referring now to FIG. 2A, a functional block diagram of an exemplary redundant solenoid control system 250 according to the principles of the present disclosure is presented. In various implementations, the redundant solenoid control system 250 includes the primary and failover controllers 202 and 204, the failover control module 206, and an operation module 252. The operation module 252 may be integrated with the failover control module 206 and one or both of the primary and failover controllers 202 and 204 into a single control module or integrated circuit.

In various implementations, the operation module 252 receives the control signal, the drive signals from the primary and failover controllers 202 and 204, and a monitor signal. The monitor signal may include a voltage or current from a node of the primary controller 202 that indicates whether the primary controller 202 is functioning properly. Based upon the received signals, the operation module 252 generates an operating signal and transmits the operating signal to the failover control module 206.

In various implementations, the operation module 252 may generate the operating signal based upon a comparison of the monitor signal with a threshold. For example, when the monitor signal is greater than the threshold, the operation module 252 may generate an operating signal indicating that the primary controller 202 is functioning properly. Otherwise, the operation module 252 may generate an operating signal indicating that the primary controller 202 is not functioning properly.

In various implementations, the operating signal may be based upon a comparison of the drive signal from the primary controller 202 with a predicted drive signal. The operation module 252 may generate the predicted drive signal based upon the control signal. When the drive signal from the primary controller 202 matches the predicted drive signal, the operation module 252 may generate an operating signal indicating that the primary controller 202 is functioning properly.

The operating signal may also be based upon a comparison of the drive signal from the primary controller 202 with the drive signal from the failover controller 204. For example, when the drive signals match, the operation module 252 may generate an operating signal indicating that the primary controller 202 is functioning properly. When the drive signals deviate by a predetermined amount for a predetermined period, the operation module 252 may indicate, via the operating signal, that the primary controller 202 is not functioning properly.

In various implementations, the operation module 252 may generate an activation signal and transmit the activation signal to the failover controller 204. The activation signal may instruct the failover controller 204 to begin generating its drive signal once the operation module 252 determines that the primary controller 202 is not functioning properly. The operation module 252 may also instruct the failover controller 204 to stop generating its drive signal after the operation module 252 determines that the primary controller 202 is once again functioning properly.

Figure 3:
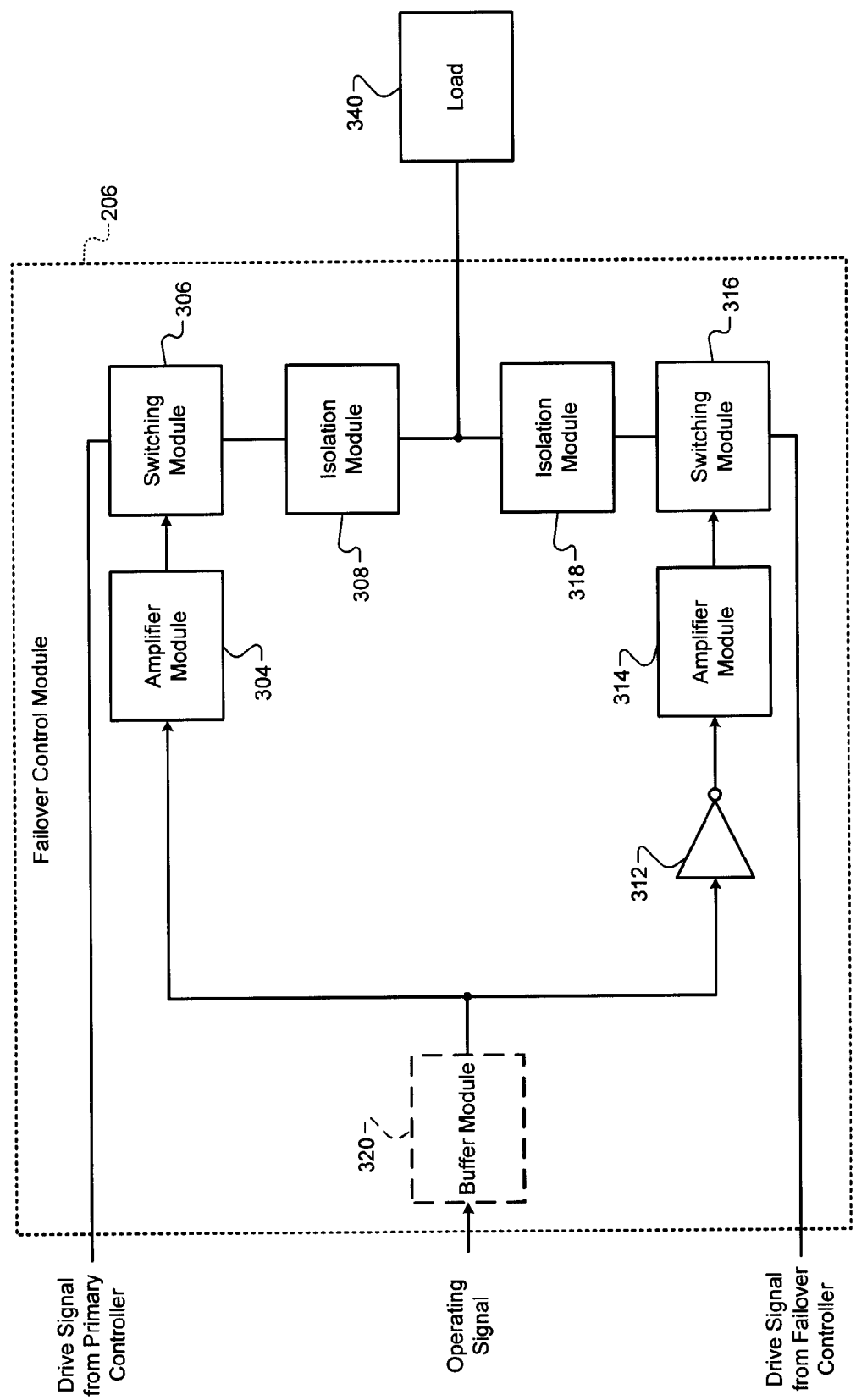
FIG. 3 is a functional block diagram of an exemplary failover control module according to the principles of the present disclosure.

Referring now to FIG. 3, a functional block diagram of the exemplary failover control module 206 according to the principles of the present disclosure is presented. In various implementations, the failover control module 206 includes an inverter module 312, amplifier modules 304 and 314, switching modules 306 and 316, and isolation modules 308 and 318. The failover control module 206 receives the drive signals from the primary and failover controllers 202 and 204. The failover control module 206 also receives the operating signal from the primary controller 202 of FIG. 2 or from the operation module 252 of FIG. 2A.

Based upon the operating signal, the failover control module 206 selects one of the drive signals to drive a load 340. In various implementations, the failover control module 206 selects the drive signal from the primary controller 202 when the operating signal indicates that the primary controller 202 is functioning properly. Otherwise, the failover control module 206 selects the drive signal from the failover controller 204. In various implementations, the load 340 may include the solenoid 120 of FIGS. 1-2A.

In various implementations, the failover control module 206 may include an optional buffer module 320, which buffers the operating signal. The buffer module 320 may be included to prevent loading the source of the operating signal. The buffer module 320 transmits a buffered operating signal to the amplifier module 304 and the inverter module 312.

The amplifier module 304 amplifies the operating signal and transmits an amplified operating signal to the switching module 306. The switching module 306 receives the drive signal from the primary controller 202 and the amplified operating signal. Based upon the amplified operating signal, the switching module 306 selectively passes the drive signal to the isolation module 308. In various implementations, the switching module 306 passes the drive signal when the amplified operating signal indicates that the primary controller 202 is functioning properly.

The isolation module 308 passes the drive signal from the switching module 306 to the load 340 and blocks signals from the switching module 316 from passing to the switching module 306. In various implementations, the isolation module 308 also blocks signals from the load 340 from passing to the switching module 306.

The inverter module 312 inverts the operating signal and transmits an inverted operating signal to the amplifier module 314. The amplifier module 314 amplifies the inverted operating signal and transmits an amplified-inverted operating signal to the switching module 316. The switching module 316 also receives the drive signal from the failover controller 204. Based upon the amplified-inverted operating signal, the switching module 316 selectively passes the drive signal to the isolation module 318. In various implementations, when the amplified-inverted operating signal indicates that the primary controller 202 is not functioning properly, the switching module 316 passes the drive signal.

The isolation module 318 passes the drive signal from the switching module 316 to the load 340 and blocks signals from the switching module 306 from passing to the switching module 316. In various implementations, the isolation module 318 also blocks signals from the load 340 from passing to the switching module 316.

Figure 4:
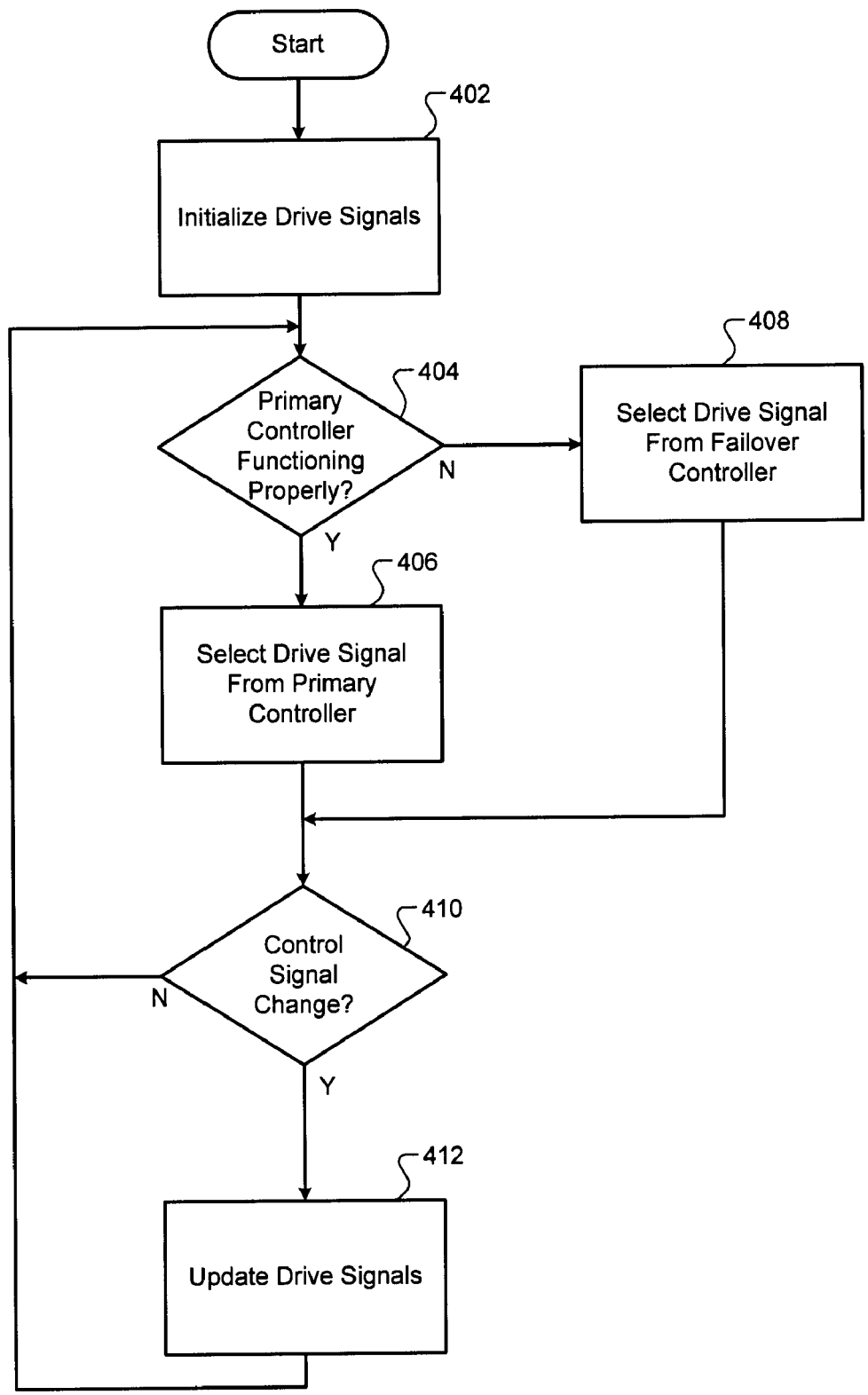
FIG. 4 is a flowchart depicting exemplary steps performed by a redundant solenoid control system according to the principles of the present disclosure.

Referring now to FIG. 4, a flowchart depicting exemplary steps performed by a redundant solenoid control system according to the principles of the present disclosure is presented. Control begins in step 402, where the drive signals of the primary and failover controllers 202 and 204 are initialized based upon the control signal.

Control continues in step 404, where control determines whether the primary controller 202 is functioning properly based upon the operating signal from the primary controller 202 of FIG. 2 or from the operation module 252 of FIG. 2A. If the operating signal indicates that the primary controller 202 is functioning properly, control continues in step 406. Otherwise, control transfers to step 408.

In step 406, control selects the drive signal from the primary controller 202 to drive the load 340, and control continues in step 410. In step 408, control selects the drive signal from the failover controller 204 to drive the load 340, and control continues in step 410. In step 410, control determines whether the control signal has changed. If the control signal has changed, control continues in step 412; otherwise, control returns to step 404. In step 412, the drive signals are updated based upon the changed control signal. Control then returns to step 404.

Figure 5:
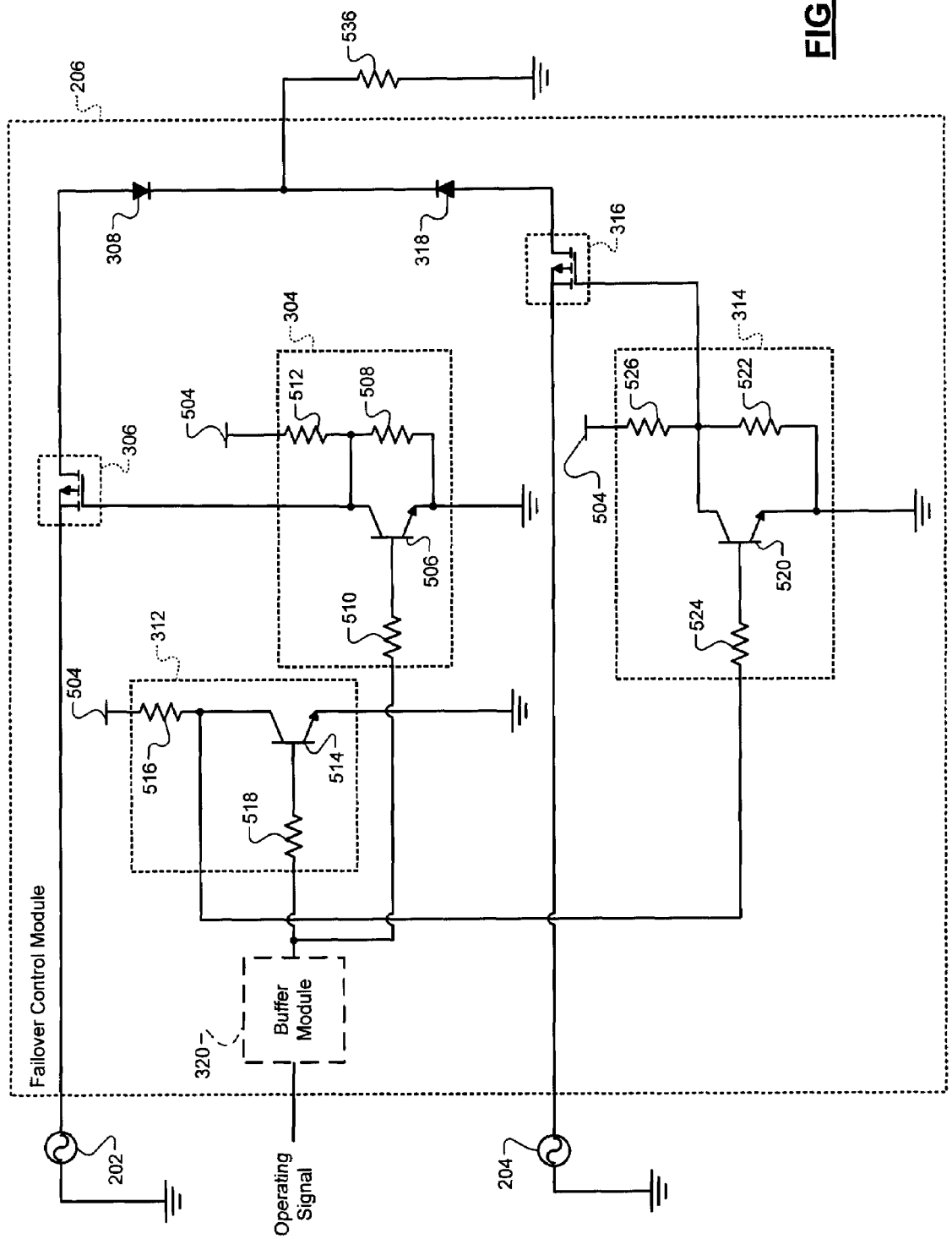
FIG. 5 is an exemplary circuit schematic of the redundant solenoid control system of FIG. 3 according to the principles of the present disclosure.

Referring now to FIG. 5, an exemplary circuit schematic of the failover control module 206 of FIG. 3 according to the principles of the present disclosure is presented. The failover control module 206 receives the operating signal from the primary controller 202 of FIG. 2 or from the operation module 252 of FIG. 2A. The failover control module 206 also receives the drive signal from the primary controller 202 and the drive signal from the failover controller 204.

The failover control module 206 includes the inverter module 312, the amplifier modules 304 and 314, the switching modules 306 and 316, and the isolation modules 308 and 318. Based upon the operating signal, the failover control module 206 selects one of the received drive signals to drive a load resistance 536. The load resistance 536 may represent an equivalent circuit for the solenoid 120 of FIGS. 1-2A.

In various implementations, the failover control module 206 selects the drive signal from the primary controller 202 when the operating signal indicates that the primary controller 202 is functioning properly. The failover control module 206 may include the buffer module 320. The buffer module 320 may include a transistor, diode, operational amplifier, or other buffer device. The buffer module 320 buffers the operating signal and transmits the buffered operating signal to the amplifier module 304 and the inverter module 312.

The amplifier module 304 may include an amplifying device 506 and resistances 508, 510, and 512. In various implementations, the ratio of the resistances 508, 510, and 512 is 10:1:1. The amplifying device 506 may include a transistor, operational amplifier, or other amplifying device. For example, the amplifying device 506 may include a bipolar junction transistor (BJT) having base, collector, and emitter terminals.

In various implementations, the amplifier module 304 is configured as an inverting amplifier. The collector terminal of the amplifying device 506 is connected to a voltage supply potential 504 via the resistance 512. The base terminal of the amplifying device 506 may receive the operating signal via the resistance 510. The collector and emitter terminals of the amplifying device 506 are connected via the resistance 508. The emitter terminal of the amplifying device 506 is also connected to a ground potential. In various implementations, the voltage supply potential 504 is derived from a 12 Volt source.

When the base terminal of the amplifying device 506 receives a voltage close to or below zero, the amplifying device 506 conducts almost no current. The voltage at the collector terminal of the amplifying device 506 is then determined by the voltage divider between the voltage supply potential 504 and the ground potential formed by the resistances 508 and 512. In various implementations, the ratio of the resistances 508 and 512 is 10:1, which causes the voltage at the collector terminal of the amplifying device 506 to approach the voltage of the voltage supply potential 504.

As the voltage at the base terminal of the amplifying device 506 increases, the current through the amplifying device 506 increases. The current flows through the resistance 512, which increases the voltage drop across the resistance 512. The voltage drop across the resistance 512 lowers the voltage at the collector terminal of the amplifying device 506. The output of the amplifier module 304 is taken from the collector terminal of the amplifying device 506.

The switching module 306 may include a transistor, relay, or other switching device. In various implementations, the switching module 306 includes a field-effect transistor (FET) having a control terminal and first and second terminals. The control terminal of the switching module 306 receives the output of the amplifier module 304. The first terminal of the switching module 306 is connected to the primary controller 202, and the second terminal is connected to the isolation module 308.

Responsive to the control terminal, the switching module 306 selectively conducts between the primary controller 202 and the isolation module 308. In various implementations, the amplifier module 304 may be configured as an inverting amplifier and the switching module 306 may include a p-channel metal-oxide-semiconductor field-effect transistor (MOSFET). In such implementations, when the operating signal is high, the output of the amplifier module 304 is low. The control terminal of the switching module 306 is therefore low, and the switching module 306 conducts between the primary controller 202 and the isolation module 308. In various implementations, the switching module 306 includes a body terminal connected to the first terminal.

The isolation module 308 may include a buffer, diode, relay, or other isolation device. In various implementations, the isolation module 308 includes a diode having an anode and a cathode. The anode of the isolation module 308 receives the drive signal via the second terminal of the switching module 306.

The isolation module 308 passes the drive signal to the load resistance 536 via the cathode. The isolation module 308 blocks signals at the cathode from passing to the anode. In various implementations, the isolation module 308 blocks signals from the switching module 316 and the load resistance 536 from passing to the switching module 306.

The inverter module 312 may include a switching device 514 and resistances 516 and 518. In various implementations, the ratio of the resistances 516 and 518 is 10:1. The switching device 514 may include a transistor, relay, or other switching device. In various implementations, the switching device 514 includes a BJT having collector, base, and emitter terminals.

The base terminal of the switching device 514 may receive the operating signal via the resistance 518. The collector terminal of the switching device 514 is connected to the voltage supply potential 504 via the resistance 516. The emitter terminal of the switching device 514 is connected to the ground potential. When the base terminal of the switching device 514 receives a voltage close to or below zero, the switching device 514 conducts little or no current. Little or no current flow through the switching device 514 causes the voltage at the collector terminal of the switching device 514 to approach the voltage of the voltage supply potential 504.

As the voltage at the base terminal increases, the current through the switching device 514 increases. When the current through the switching device 514 increases, the voltage drop across the resistance 516 increases, which lowers the voltage at the collector terminal of the switching device 514. The output of the inverter module 312 is the inverted operating signal and is taken from the collector terminal of the switching device 514.

The amplifier module 314 receives the inverted operating signal from the inverter module 312. The amplifier module 314 may include an amplifying device 520 and resistances 522, 524, and 526. In various implementations, the ratio of the resistances 522, 524, and 526 is 10:1:1. The amplifying device 520 may include a transistor, operational amplifier, or other amplifying device. For example, the amplifying device 520 may include a BJT having collector, base, and emitter terminals.

In various implementations, the amplifier module 314 is configured as an inverting amplifier. The base terminal of the amplifying device 520 may receive the inverted operating signal via the resistance 524. The collector terminal of the amplifying device 520 is connected to the voltage supply potential 504 via the resistance 526. The collector and emitter terminals of the amplifying device 520 are connected via the resistance 522. The emitter terminal of the amplifying device 520 is also connected to the ground potential.

The amplifier module 314 may function in a substantially similar manner as the amplifier module 304. When the base terminal of the amplifying device 520 receives a voltage close to or below zero, the voltage at the collector terminal of the amplifying device 520 approaches the voltage of the voltage supply potential 504. As the voltage at the base terminal increases, the voltage at the collector terminal of the amplifying device 520 decreases. The output of the amplifier module 304 is taken from the collector terminal of the amplifying device 520.

The switching module 316 may include a transistor, relay, switch, or other switching device. In various implementations, the switching module 316 includes a FET having a control terminal and first and second terminals. The control terminal of the switching module 316 receives the output of the amplifier module 314. The first terminal of the switching module 316 is connected to the failover controller 204 and the second terminal is connected to the isolation module 318.

Responsive to the control terminal, the switching module 316 selectively conducts between the failover controller 204 and the isolation module 318. In various implementations, the amplifier module 314 may be configured as an inverting amplifier and the switching module 316 may include a p-channel MOSFET. In such implementations, the amplifier module 314 inverts the inverted operating signal received at its input. Therefore, the control terminal of the switching module 316 receives a signal similar to the operating signal. The switching module 316 may conduct between the failover controller 204 and the isolation module 318 when the operating signal is low. In various implementations, the switching module 316 includes a body terminal connected to the first terminal.

The isolation module 318 may include a buffer, diode, relay, or other isolation device. In various implementations, the isolation module 318 may include a diode having anode and cathode terminals that are connected to the second terminal of the switching module 316 and the load resistance 536, respectively. The isolation module 318 passes signals from the anode terminal to the cathode terminal and blocks signals from passing from the cathode terminal to the anode terminal.

Figure 6:
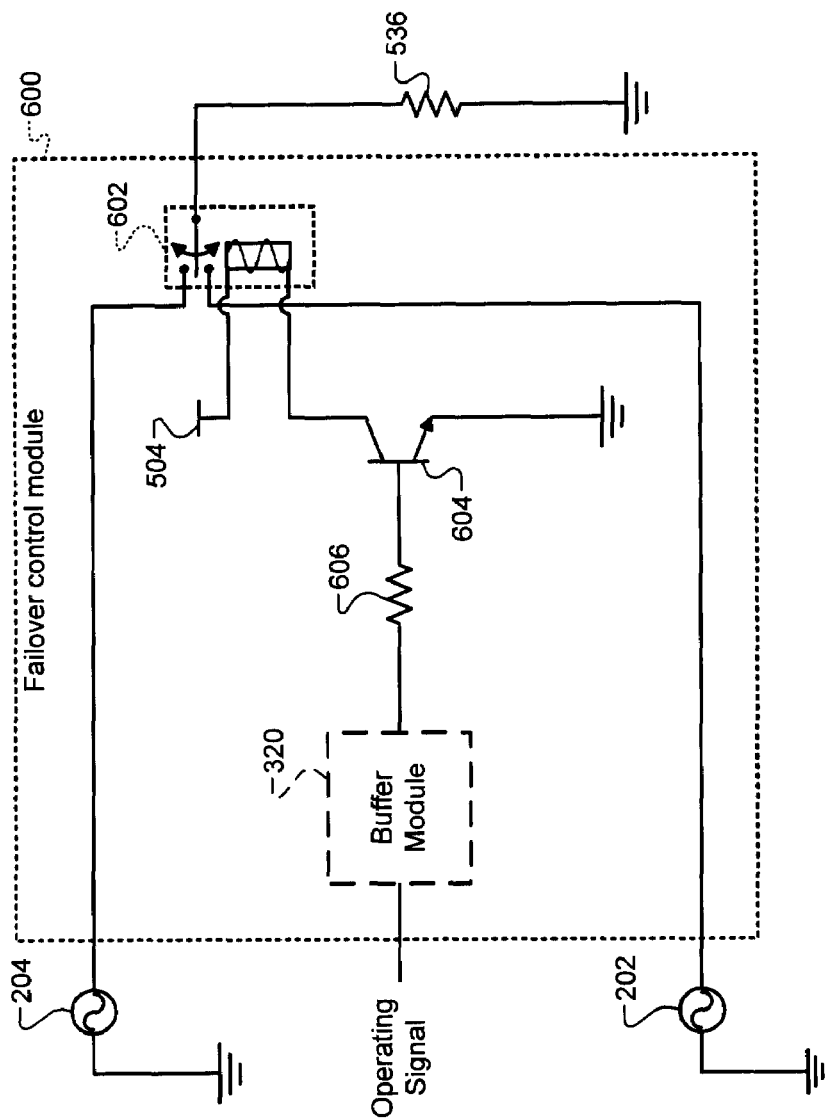
FIGS. 6-7 are exemplary circuit schematics of redundant solenoid control systems according to the principles of the present disclosure.

Referring now to FIG. 6, an exemplary circuit schematic of a failover control module 600 according to the principles of the present disclosure is presented. The failover control module 600 receives the operating signal from the primary controller 202 of FIG. 2 or from the operation module 252 of FIG. 2A and the drive signals from the primary and failover controllers 202 and 204. In various implementations, the failover control module 600 includes a relay module 602 and a switching device 604. The failover control module 600 may include the buffer module 320, which buffers the operating signal.

In various implementations, the relay module 602 includes a single pole double throw relay having a coil, a common terminal, and first and second terminals. The coil of the relay module 602 is connected between the voltage supply potential 504 and the switching device 604. The first terminal of the relay module 602 receives the drive signal from the primary controller 202, and the second terminal receives the drive signal from the failover controller 204. The common terminal of the relay module 602 passes the drive signal from one of the primary and failover controllers 202 and 204 to the load resistance 536. In various implementations, the load resistance 536 may represent an equivalent circuit for the solenoid 120 of FIGS. 1-2A.

When little or no current flows through the coil of the relay module 602, the common terminal contacts the second terminal of the relay module 602. In various implementations, a spring or other device may hold the common terminal of the relay module 602 in contact with the second terminal. When enough current flows through the coil of the relay module 602, the current pulls the common terminal in contact with the first terminal.

The switching device 604 determines the amount of current flowing through the coil of the relay module 602. The switching device 604 may include a transistor, relay, or other switching device. In various implementations, the switching device 604 includes a BJT having collector, base, and emitter terminals. The base terminal of the switching device 604 may receive the operating signal via a resistance 606. The emitter terminal of the switching device 604 is connected to the ground potential.

In various implementations, the current flow through the coil of the relay module 602 is based upon the current flowing through the switching device 604. The current flowing through the switching device 604 is determined by the voltage of the operating signal as received at the base terminal. When the voltage of the operating signal is close to or below zero, the switching device 604 draws little or no current through the coil of the relay module 602. As the voltage of the operating signal increases, the current through the switching device 604 increases, and the current flow through the coil increases.

When the operating signal is high, the common terminal of the relay module 602 is pulled in contact with the first terminal, and the relay module 602 passes the drive signal from the primary controller 202. When the operating signal is low, the common terminal of the relay module 602 is held in contact with the second terminal, and the relay module 602 passes the drive signal from the failover controller 204.

Figure 7:
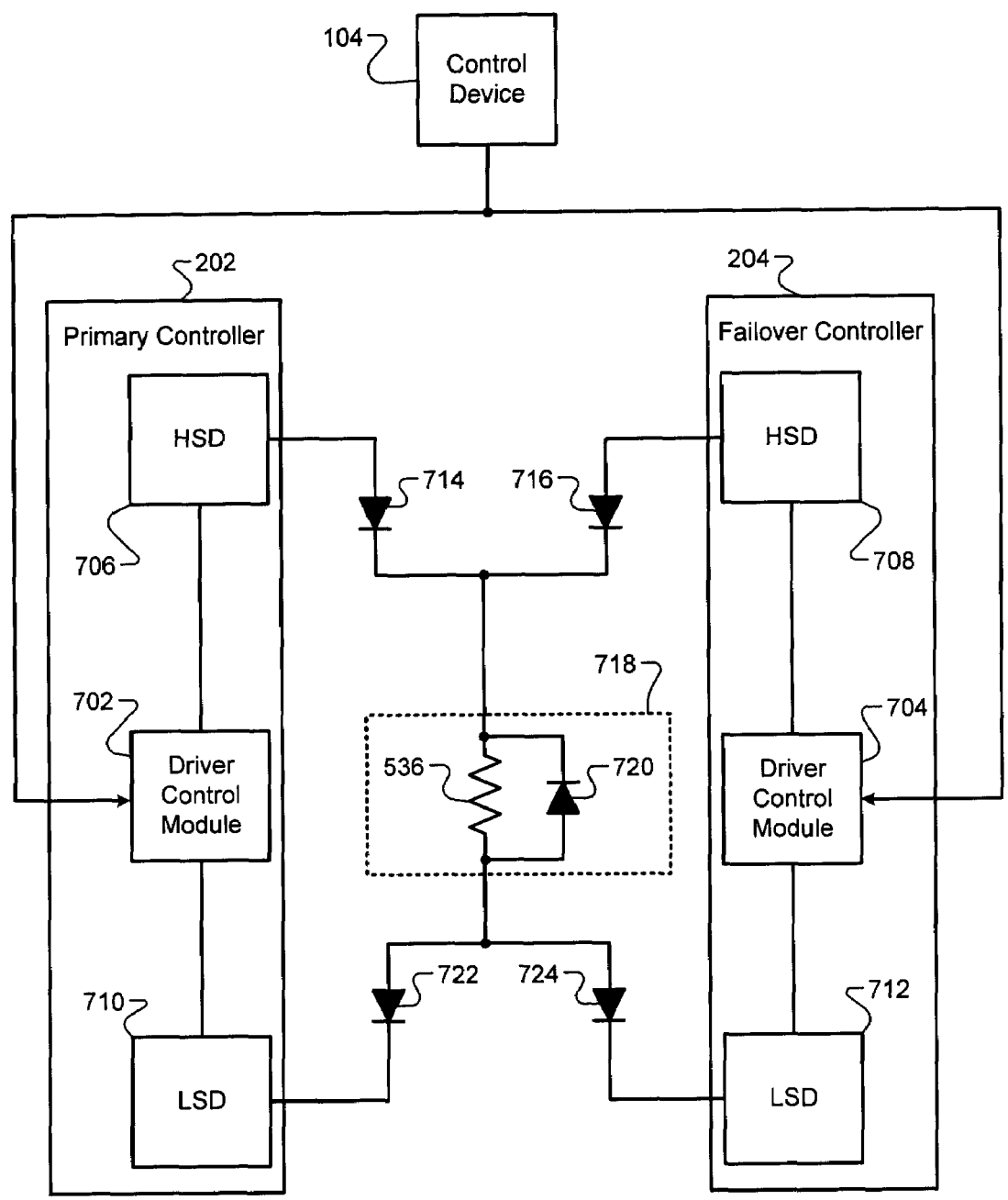

Referring now to FIG. 7, an exemplary circuit schematic of an alternative redundant solenoid control system according to the principles of the present disclosure is presented. In various implementations, the primary and failover controllers 202 and 204 include feedback controllers, feedforward controllers, open loop controllers, and/or programmable-integral-derivative (PID) controllers. For example, the primary and failover controllers 202 and 204 may respectively include driver control modules (DCMs) 702 and 704, high side drivers (HSDs) 706 and 708, and low side drivers (LSDs) 710 and 712.

The redundant solenoid control system includes isolation modules 714, 716, 722, and 724. The isolation modules 714, 716, 722, and 724 may include diodes, transistors, relays, or other isolation devices. In various implementations, the isolation modules 714, 716, 722, and 724 include diodes having anodes and cathodes.

The DCMs 702 and 704 receive the control signal from the control device 104. The DCM 702 generates driver control signals for the HSD 706 and the LSD 710 based upon the control signal. The DCM 704 generates driver control signals for the HSD 708 and the LSD 712 based upon the control signal. The HSDs 706 and 708 and the LSDs 710 and 712 each generate a solenoid drive signal based upon the received driver control signals. The solenoid drive signals drive a load 718.

In various implementations, the HSDs 706 and 708 and the LSDs 710 and 712 may communicate with the DCMs 702 and 704 to indicate difficulty in driving the load 718 in an effort to effectively manage possible fault mode scenarios. For example, when the resistance of the load 718 increases, providing a constant current may cause voltage operating limits of components of the redundant solenoid control system to be exceeded. When the resistance of the load 718 decreases, maintaining a constant voltage across the load 718 may exceed current handling capabilities of components of the redundant solenoid control system.

In various implementations, the anodes of the isolation modules 714 and 716 are connected to the HSDs 706 and 708, respectively. The cathodes of the isolation modules 714 and 716 are connected to a first node of the load 718. The load 718 may represent an equivalent circuit of the solenoid 120 of FIGS. 1-2A. The load 718 includes the load resistance 536 and may include a protection diode 720. In various implementations, the protection diode 720 may have a predefined breakdown voltage to prevent over voltage conditions at the load resistance 536.

A first end of the load resistance 536 and a cathode of the protection diode 720 are connected to the first node of the load 718. A second end of the load resistance 536 and an anode of the protection diode 720 are connected to a second node of the load 718. The anodes of the isolation modules 722 and 724 are also connected to the second node of the load 718. The cathodes of the isolation modules 722 and 724 are connected to the LSDs 710 and 712, respectively.

Figure 8:
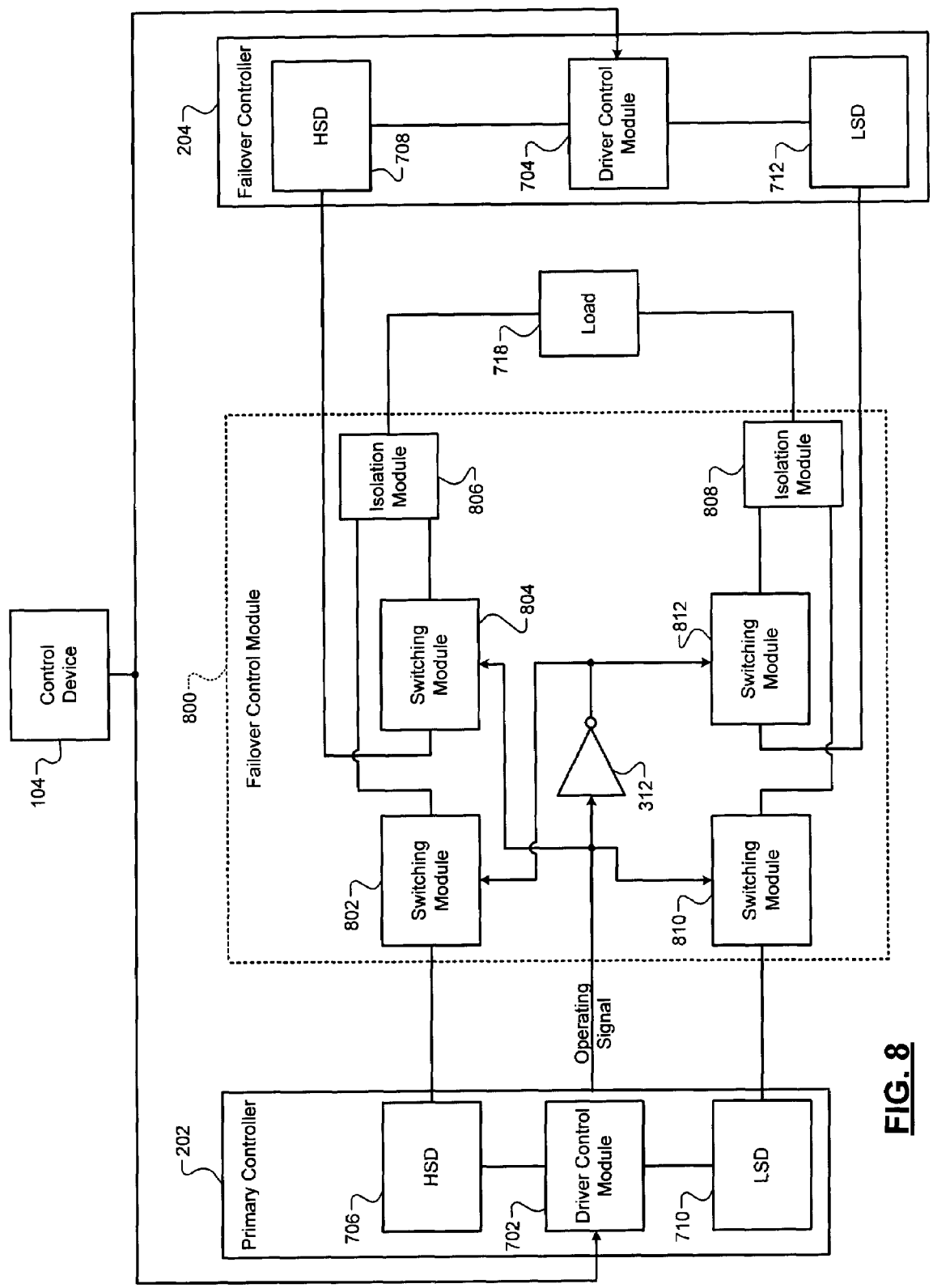
FIG. 8 is a functional block diagram of an exemplary redundant solenoid control system according to the principles of the present disclosure.

Referring now to FIG. 8, a functional block diagram of an exemplary redundant solenoid control system according to the principles of the present disclosure is presented. A failover control module 800 receives the solenoid drive signals from the HSDs 706 and 708 and the LSDs 710 and 712. The failover control module 800 also receives the operating signal from the primary controller 202. Alternatively, the failover control module 800 may receive the operating signal from the operation module 252 of FIG. 2A.

The failover control module 800 may include the inverter module 312, switching modules 802, 804, 810, and 812, and isolation modules 806 and 808. In various implementations, the failover control module 800 and the primary controller 202 may be integrated into a single control module or integrated circuit. The inverter module 312 may be powered by the failover control module 204 or by an independent source so a failure of the primary controller 202 does not affect operation of the inverter module 312.

The inverter module 312 receives and inverts the operating signal. In various implementations, the switching modules 802 and 804 are connected between the isolation module 806 and the HSDs 706 and 708, respectively. Controlled by the operating signal, the switching modules 802 and 804 selectively conduct between the isolation module 806 and the HSDs 706 and 708, respectively.

In various implementations, when the operating signal indicates that the primary controller 202 is functioning properly, the switching module 802 conducts between the HSD 706 and the isolation module 806. When the operating signal indicates that the primary controller 202 is not functioning properly, the switching module 804 may conduct between the HSD 708 and the isolation module 806.

The isolation module 806 connects the switching modules 802 and 804 to the load 718. In various implementations, the isolation module 806 prevents signals from traveling between the switching modules 802 and 804. The isolation module 806 may also prevent signals from traveling to the switching modules 802 and 804 from the load 718.

The isolation module 808 connects the load 718 to the switching modules 810 and 812. In various implementations, the isolation module 808 prevents signals from traveling between the switching modules 810 and 812. The isolation module 808 may also prevent signals from traveling to the load 718 from the switching modules 810 and 812.

The switching modules 810 and 812 are connected between the isolation module 808 and the LSDs 710 and 712, respectively. Controlled by the operating signal, the switching modules 810 and 812 selectively conduct between the isolation module 808 and the LSDs 710 and 712, respectively. In various implementations, when the operating signal indicates that the primary controller 202 is functioning properly, the switching module 810 conducts between the isolation module 808 and the LSD 710. When the operating signal indicates that the primary controller 202 is not functioning properly, the switching module 812 may conduct between the isolation module 808 and the LSD 712.

In various implementations, when the operating signal indicates that the primary controller 202 is functioning properly, the solenoid drive signals from the HSD 706 and the LSD 710 drive the load 718. When the operating signal indicates that the primary controller 202 is not functioning properly, the solenoid drive signals from the HSD 708 and the LSD 712 drive the load 718.

Figure 9:
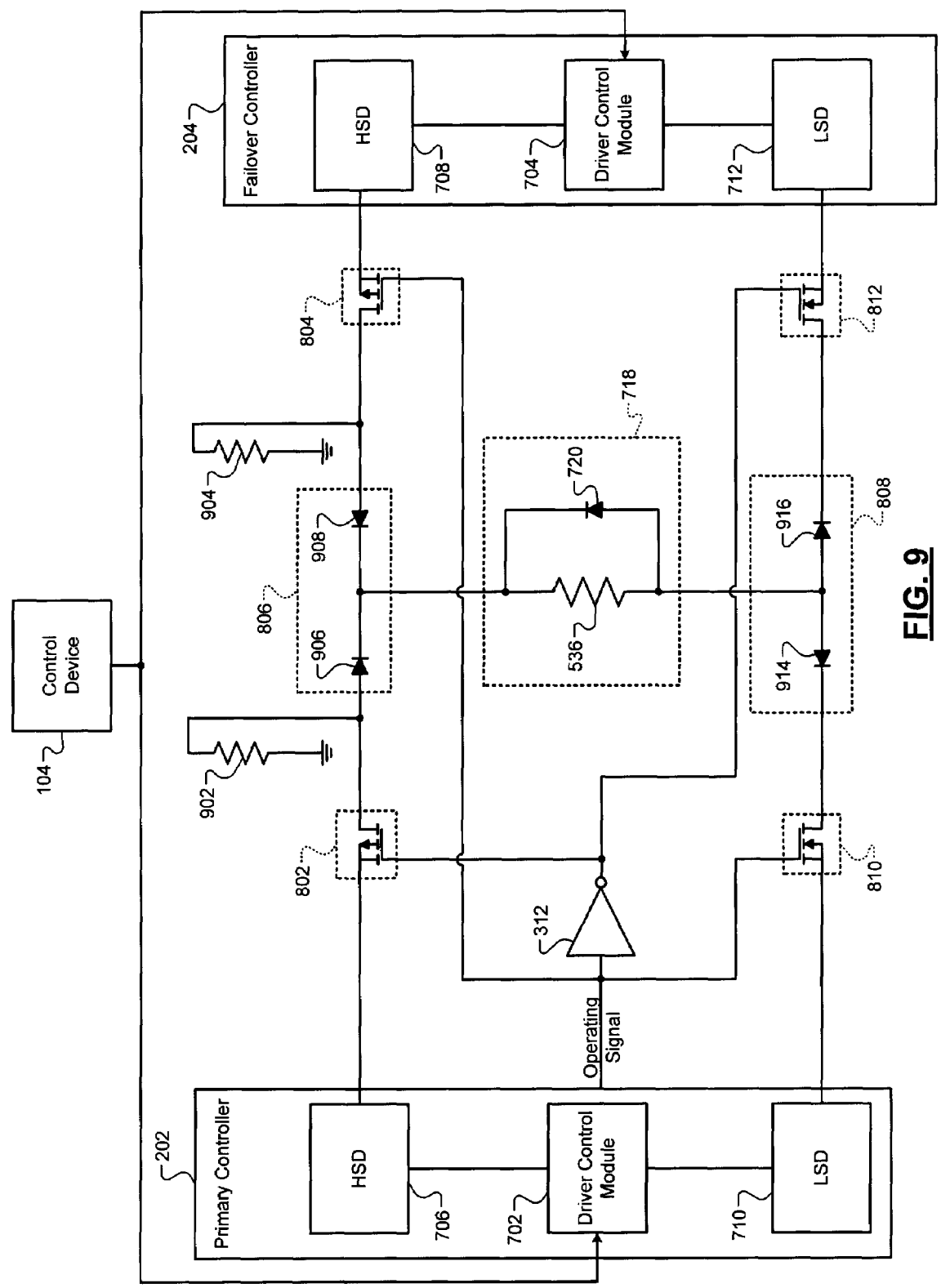
FIG. 9 is an exemplary circuit schematic of the redundant solenoid control system of FIG. 8 according to the principles of the present disclosure.

Referring now to FIG. 9, an exemplary circuit schematic of the redundant solenoid control system of FIG. 8 according to the principles of the present disclosure is presented. The switching modules 802, 804, 810, and 812 may include transistors, relays, or other switching devices. In various implementations, the switching modules 802, 804, 810, and 812 include field-effect transistors (FETs) having control terminals and first and second terminals.

The first terminals of the switching modules 802 and 804 are connected to the HSDs 706 and 708, respectively. The second terminals of the switching modules 802 and 804 are connected to the isolation module 806. In various implementations, resistances 902 and 904 are connected between the ground potential and the second terminals of the switching modules 802 and 804, respectively. The control terminals of the switching modules 802 and 804 receive the inverted operating signal and the operating signal, respectively.

Responsive to their control terminals, the switching modules 802 and 804 selectively conduct between their first and second terminals. In various implementations, the switching modules 802 and 804 include p-channel metal-oxide-semiconductor field-effect transistors (MOSFETs). When the voltage of the operating signal is high, the switching module 802 may conduct between its first and second terminals. When the voltage of the operating signal is low, the switching module 804 may conduct between its first and second terminals. In various implementations, the switching modules 802 and 804 include body terminals connected to their first terminals.

The isolation module 806 may include buffers, diodes, relays, or other isolation devices. In various implementations, the isolation module 806 includes diodes 906 and 908 having anodes and cathodes. The anodes of the diodes 906 and 908 are connected to the second terminals of the switching modules 802 and 804, respectively. The cathodes of the diodes 906 and 908 are connected to the first node of the load 718.

The isolation module 808 may include buffers, diodes, relays, or other isolation devices. In various implementations, the isolation module 808 includes diodes 914 and 916 having anodes and cathodes. The anodes of the diodes 914 and 916 are connected to the second node of the load 718. The cathodes of the diodes 914 and 916 are connected to the second terminals of the switching modules 810 and 812, respectively.

The first terminals of the switching modules 810 and 812 are connected to the LSDs 710 and 712, respectively. The control terminals of the switching modules 810 and 812 receive the operating signal and the inverted operating signal, respectively. Responsive to their control terminals, the switching modules 810 and 812 selectively conduct between their first and second terminals.

In various implementations, the switching modules 810 and 812 include n-channel MOSFETs. When the voltage of the operating signal is high, the switching module 810 may conduct between its first and second terminals. When the voltage of the operating signal is low, the switching module 812 may conduct between its first and second terminals. In various implementations, the switching modules 810 and 812 include body terminals connected to their first terminals.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A solenoid control system for a vehicle, comprising:
a primary controller that generates a first solenoid drive signal based upon a control signal;
a failover controller that selectively generates a second solenoid drive signal based upon said control signal; and
a failover control module that receives an operating signal indicating whether said primary controller is functioning properly and that selects said second solenoid drive signal to drive a solenoid when said operating signal indicates that said primary controller is not functioning properly.

2. A transmission system comprising:
the solenoid control system of claim 1; and
a transmission including said solenoid.

3. The transmission system of claim 2 wherein said solenoid selectively engages a gear within said transmission.

4. The transmission system of claim 2 further comprising a gear shifter that generates said control signal.

5. The solenoid control system of claim 1 wherein said failover control module selects said first solenoid drive signal to drive said solenoid when said operating signal indicates that said primary controller is functioning properly.

6. The solenoid control system of claim 1 wherein said failover control module comprises:
a first switching module that selectively passes said first solenoid drive signal to said solenoid based upon said operating signal; and
a second switching module that selectively passes said second solenoid drive signal to said solenoid based upon said operating signal.

7. The solenoid control system of claim 1 wherein said operating signal is received from said primary controller.

8. The solenoid control system of claim 7 wherein said operating signal comprises a voltage of a node of said primary controller.

9. The solenoid control system of claim 1 further comprising an operation module that determines whether said primary controller is functioning properly and that generates said operating signal accordingly.

10. The solenoid control system of claim 9 wherein said operation module determines whether said primary controller is functioning properly based upon a comparison of said first solenoid drive signal with a predicted solenoid drive signal.

11. The solenoid control system of claim 9 wherein said operation module determines whether said primary controller is functioning properly based upon a comparison of said first and second solenoid drive signals.

12. The solenoid control system of claim 9 wherein said operation module directs said failover controller to generate said second solenoid drive signal when said primary controller is not functioning properly.

13. A method comprising:
generating a first solenoid drive signal based upon a control signal using a primary controller;
selectively generating a second solenoid drive signal based upon said control signal using a failover controller;
generating an operating signal that indicates whether said first solenoid drive signal is reliable; and
selecting said second solenoid drive signal to drive a solenoid when said operating signal indicates that said first solenoid drive signal is not reliable.

14. The method of claim 13 further comprising generating said control signal based upon operation of a gear shifter.

15. The method of claim 13 further comprising selecting said first solenoid drive signal to drive said solenoid when said operating signal indicates that said first solenoid drive signal is reliable.

16. The method of claim 13 further comprising generating said operating signal based upon a voltage of a node that indicates whether said first solenoid drive signal is reliable.

17. The method of claim 13 further comprising determining whether said first solenoid drive signal is reliable based upon a comparison of said first solenoid drive signal with a predicted solenoid drive signal.

18. The method of claim 13 further comprising determining whether said first solenoid drive signal is reliable based upon a comparison of said first and second solenoid drive signals.

19. The method of claim 13 further comprising directing that said second solenoid drive signal be generated when said operating signal indicates that said first solenoid drive signal is not reliable.

* * * * *

UNITED STATES PATENT AND TRADEMARK OFFICE
CERTIFICATE OF CORRECTION

| | | |
|---|---|---|
| PATENT NO. | : 8,000,859 B2 | Page 1 of 1 |
| APPLICATION NO. | : 12/119744 | |
| DATED | : August 16, 2011 | |
| INVENTOR(S) | : Jack P. Koski et al. | |

It is certified that error appears in the above-identified patent and that said Letters Patent is hereby corrected as shown below:

On the title page, the Patent Title (54), "DUEL CONTROL SOLENOID CIRCUIT" should be
--DUAL CONTROL SOLENOID CIRCUIT--

Signed and Sealed this

Eighth Day of November, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,000,859 B2 | |
| APPLICATION NO. | : 12/119744 | |
| DATED | : August 16, 2011 | |
| INVENTOR(S) | : Jack P. Koski et al. | |

It is certified that error appears in the above-identified patent and that said Letters Patent is hereby corrected as shown below:

On the title page, Item (54) and at Column 1, line 1, Title, "DUEL CONTROL SOLENOID CIRCUIT" should be
--DUAL CONTROL SOLENOID CIRCUIT--

This certificate supersedes the Certificate of Correction issued November 8, 2011.

Signed and Sealed this
Sixth Day of December, 2011

David J. Kappos
*Director of the United States Patent and Trademark Office*